(12) United States Patent
Palacio et al.

(10) Patent No.: US 7,255,816 B2
(45) Date of Patent: *Aug. 14, 2007

(54) METHOD OF RECYCLING BONDED FIBROUS MATERIALS AND SYNTHETIC FIBERS AND FIBER-LIKE MATERIALS PRODUCED THEREOF

(75) Inventors: Gustavo Palacio, Medellin (CO); Maria Clara Garcia, Medellin (CO); Pablo Ramirez, Medellin (CO); Bernardo Vanegas, Antioquia (CO)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 547 days.

This patent is subject to a terminal disclaimer.

(21) Appl. No.: 09/992,110

(22) Filed: Nov. 5, 2001

(65) Prior Publication Data

US 2002/0132121 A1     Sep. 19, 2002

Related U.S. Application Data

(60) Provisional application No. 60/247,321, filed on Nov. 10, 2000.

(51) Int. Cl.
*B29B 17/00*     (2006.01)

(52) U.S. Cl. .................. 264/37.1; 264/37.28; 264/913; 156/94

(58) Field of Classification Search ................. 264/913, 264/37.1, 37.28; 442/335, 336, 414; 428/357, 428/359, 364, 903.3; 156/94
See application file for complete search history.

(56) References Cited

U.S. PATENT DOCUMENTS

| | | | |
|---|---|---|---|
| 1,815,007 A | 7/1931 | Knoll | |
| 1,831,004 A | 11/1931 | Hope | |
| 1,980,253 A | 11/1934 | Bryan | |
| 2,666,369 A | 1/1954 | Niks | |
| 3,485,706 A | 12/1969 | Evans | |

(Continued)

FOREIGN PATENT DOCUMENTS

| AT | 314961 | 3/1974 |
|---|---|---|
| CA | 841938 | 5/1970 |
| DE | 3116005 A1 | 10/1982 |
| DE | 4425237 | 1/1996 |
| EP | 0492554 | 7/1992 |

(Continued)

OTHER PUBLICATIONS

U.S. Appl. No. 10/012,768, filed Nov. 5, 2001, Palacio et al.

(Continued)

*Primary Examiner*—Elizabeth M. Cole
(74) *Attorney, Agent, or Firm*—Richard M. Shane; Karl V. Sidor; Nathan P. Hendon

(57) ABSTRACT

A method of recycling bonded fibrous materials, the method includes the steps of: providing pieces of bonded fibrous materials, the pieces having sizes that are adapted for suspension in a liquid; suspending the discrete pieces of bonded fibrous materials in a liquid; applying mechanical work to the liquid suspension of discrete pieces to generate hydraulic pressure and mechanical shear stress conditions sufficient to hydraulically fragment the bonded fibrous materials into fibers and fiber-like components; and separating substantially individual fibers and fiber-like components from the liquid. The method is used to produce recycled synthetic fibers and fiber-like materials that have at least one thread element composed of synthetic material having at least one irregular distortion generated by hydraulic fracture of the thread element to separate it from a bonded fibrous material while the bonded fibrous material is suspended in a liquid.

15 Claims, 14 Drawing Sheets

U.S. PATENT DOCUMENTS

| | | | |
|---|---|---|---|
| 3,692,618 | A | 9/1972 | Dorschner et al. |
| 3,821,068 | A | 6/1974 | Shaw |
| 3,849,241 | A | 11/1974 | Butin et al. |
| 3,890,220 | A | 6/1975 | Anderson |
| 4,100,324 | A | 7/1978 | Anderson et al. |
| 4,340,563 | A | 7/1982 | Appel et al. |
| 4,366,111 | A | 12/1982 | Dinius et al. |
| 4,735,682 | A | 4/1988 | Didwania et al. |
| 4,767,586 | A | 8/1988 | Radwanski et al. |
| 4,808,467 | A | 2/1989 | Suskind et al. |
| 4,879,170 | A | 11/1989 | Radwanski et al. |
| 4,931,355 | A | 6/1990 | Radwanski et al. |
| 5,151,320 | A | 9/1992 | Homonoff et al. |
| 5,191,533 | A | 3/1993 | Haug |
| 5,284,703 | A | 2/1994 | Everhart et al. |
| 5,322,225 | A | 6/1994 | Cina |
| 5,328,759 | A | 7/1994 | McCormack et al. |
| 5,382,400 | A | 1/1995 | Pike et al. |
| 5,521,305 | A | 5/1996 | Huber et al. |
| 5,573,841 | A | 11/1996 | Adam et al. |
| 5,687,916 | A | 11/1997 | Romano, III et al. |
| 6,022,818 | A | 2/2000 | Welchel et al. |
| 6,103,061 | A | 8/2000 | Anderson et al. |

FOREIGN PATENT DOCUMENTS

| | | |
|---|---|---|
| EP | 0560556 | 9/1993 |
| GB | 615169 | 1/1949 |
| JP | 5-32271 | 2/1993 |
| JP | 5-83505 | 4/1993 |
| JP | 8-291488 | 11/1996 |
| WO | WO96/06222 A1 | 2/1996 |
| WO | WO9606222 A1 * | 2/1996 |

OTHER PUBLICATIONS

U.S. Appl. No. 10/012,766, filed Nov. 5, 2001, Palacio et al.

Japanese Laid-Open Patent Publication Sho 49-36903, published date Apr. 5, 1974, and sumary in English language from Japanese law firm. (Due to age of patent we are unable to obtain English abstract.).

Japanese Laid-Open Patent Publication Sho 49-31909, published date Mar. 23, 1974, and summary in English language from Japanese law firm. (Due to age of patent we are unable to obtain English abstract.).

Japanese Laid-Open Patent Publication Sho 50-122579, published date Sep. 26, 1975, and summary in English language from Japanese law firm. (Due to age of patent we are unable to obtain English abstract.).

Japanese Patent Publication Sho 26-2753, published date May 29, 1951, summary in English language from Japanese law firm. (Due to age of patent we are unable to obtain a copy of the patent or an abstract.).

Japanese Patent 4,559 Specification, patented date Feb. 13, 1901, summary in English language from Japanese law firm. (Due to age of patent we are unable to obtain a copy of the patent or an abstract.).

* cited by examiner

METHOD OF RECYCLING BONDED FIBROUS MATERIALS AND SYNTHETIC FIBERS AND FIBER-LIKE MATERIALS PRODUCED THEREOF

This application claims priority from presently copending U.S. Provisional Application No. 60/247,321, the disclosure of which is hereby incorporated by reference.

FIELD OF THE INVENTION

The present invention relates to recycling techniques and the materials produced utilizing such techniques.

BACKGROUND

Paper and textile materials made entirely of natural fibers (e.g., animal or vegetable fibers) and/or cellulosic fibers (e.g., pulp fibers) are frequently recycled. Techniques to recycle these materials have been developed to break them down into fibers or fiber-like material and then reform the materials to provide paper and paper-like products. Natural fiber textiles and/or paper are dispersed in water by a pulping operation to create a slurry of individual fibers. The fibers may be cleaned and or treated to remove ink, adhesives or other contaminants. The treated fibers may be further refined and/or fractionated before being formed into a wet-laid web. In conventional recycling operations, synthetic materials are considered contaminants and are typically removed. The synthetic material may be present in the form of synthetic or manufactured fibers and/or filaments or in the form of adhesives, binders or the like.

Woven and nonwoven fabrics composed partially or entirely of synthetic or manufactured fibers have generated problems for conventional processes focused on recycling natural and/or cellulosic fibers. In addition, high-strength natural and/or cellulosic fiber based fabrics that utilize adhesives, binders and/or mechanical entangling, such as hydraulic entangling, also provide problems for conventional recycling processes.

These types of fabrics are generally difficult or impossible to disperse into individual fibers in a wet process such as a pulping operation. This is particularly apparent if the fabric is formed of synthetic fibers joined by thermal or adhesive bonding. In some cases, fiber or filament "ropes" may form. If the synthetic material is thermoplastic, mechanical work from the processes used to break-up or shred the material may generate sufficient heat to cause the material to melt into unusable globs and clumps.

Generally speaking, fabrics composed of synthetic materials or composites containing synthetic and natural materials are recycled utilizing one of two methods. In the first method, fabrics composed entirely of synthetic thermoplastic material are cleaned, melted and then extruded or formed into staple fibers, continuous filaments or films. If the fabric is a composite containing synthetic thermoplastic materials and natural (or non-thermoplastic synthetic material), the natural (or non-thermoplastic synthetic) materials must first be separated from the thermoplastic materials before further processing. This is often impractical because thermal, mechanical and/or adhesive bonding between the components of the composite make separation difficult. Even if separation is possible, the method requires multiple processing steps and energy to melt and reform the material. While the resulting fibers, filaments or films may contain recycled materials, the fibers, filaments or films may be characterized as "manufactured" or "extruded" from recycled polymer feedstock.

The second method involves mechanically breaking up a fabric into smaller pieces such as fiber bundles, threads and/or individual fibers. This is normally accomplished by mechanical tearing and shredding dry material. For example, International Application PCT/SE95/00938 states that it is known to mechanically shred dry nonwoven and textile waste and that dry mixed waste containing both synthetic and natural fibers may be used. According to PCT/SE95/00938, a significant feature of shredding and tearing techniques is that the tearing or shredding operation is often incomplete so that recycled fibers are present partly in the form of discrete bits of the original fabric that may be characterized as "flocks" or fiber bundles. These flocks are described as providing non-uniformities that give webs containing such flocks a textile-like appearance.

Flocks and bits of fabric are difficult to process in subsequent operations such as, for example, a wet-laying process, air-laying process, hydraulic entangling process or other web-forming processes. Presence of these non-uniformities may reduce the value of the recycled fibers as well as degrade the appearance, strength, uniformity and other desirable properties of a web or fabric made with the recycled fibers. Removing the non-uniformities by screening or other techniques reduces the efficiency of the fiber recovery. Additional dry mechanical chopping, shredding, tearing, garnetting or picking operations to reduce the fiber bundles or flocks into fibers or fiber-like material having a length of less than 5 millimeters may be impractical. In addition, the additional mechanical work may transfer so much energy in the form of heat that the dry material may melt into unusable clumps and may diminish or eliminate any environmental or economic advantages initially presented by recycling the material.

While previous techniques may be of interest to those seeking to recycle thermoplastic material into polymer feedstock for reprocessing as well as those seeking to mechanically tear or shred dry waste fabrics into smaller pieces, they fail to address many existing needs. For example, previous techniques fail to address the need for a wet process to substantially isolate or individualize fibers and/or filaments from a textile or nonwoven fabric. As another example, previous techniques fail to address the need for a wet process to produce usable fibers and fiber-like material from thermally bonded, adhesively bonded and/or mechanically entangled fabrics such as textiles and nonwoven webs.

Previous techniques fail to address the need for a wet process to convert fabrics into individualized fibers and/or filaments having dimensions similar to cellulosic pulps and short natural fibers such as, for example, lengths less than five millimeters. For example, previous techniques fail to address the need for a process to convert fabrics into individualized fibers and/or filaments having dimensions similar to conventional cellulosic pulps and short natural fibers such as, for example, lengths less than five millimeters.

There is still a need for an inexpensive recycled fiber or fiber-like material that may be easily processed into a uniform sheet or web. For example, there is a need for an inexpensive recycled fiber or fiber-like material that may be processed into a uniform sheet or web utilizing conventional wet-forming or dry-forming techniques. This is also a need for a uniform sheet or web that may include at least a portion of an inexpensive recycled fiber or fiber-like material.

There is also a need for a high strength sheet or wiper that is able to quickly absorb several times its weight in water, aqueous liquid or oil. A need exists for a sheet or wiper that contains an inexpensive recycled fiber or fiber-like material and which is able to quickly absorb several times its weight in water, aqueous liquid or oil. A need exists for a sheet or wiper that contains an inexpensive recycled fiber or fiber-like material and that can be used as a wiper or as a fluid distribution layer and/or absorbent component of an absorbent product. Meeting this need is important since it is both economically and environmentally desirable to substitute recycled fiber or fiber-like materials for high-quality virgin wood fiber pulp and/or new synthetic fibers or filaments and still provide a product that can be used as a wiper or as a fluid distribution layer and/or absorbent component of an absorbent product.

SUMMARY OF THE INVENTION

The problems identified above have been addressed by the present invention which is directed to a method of recycling bonded fibrous materials. The method includes the steps of: (a) providing pieces of bonded fibrous materials, the pieces having sizes that are adapted for suspension in a liquid; (b) suspending the discrete pieces of bonded fibrous materials in a liquid; (c) applying mechanical work to the liquid suspension of discrete pieces to generate hydraulic pressure and mechanical shear stress conditions sufficient to hydraulically fragment the bonded fibrous materials into fibers and fiber-like components; and (4) separating substantially individual fibers and fiber-like components from the liquid.

Generally speaking, the pieces of bonded fibrous material may have a length ranging from about 10 to about 350 millimeters and a width ranging from about 3 to about 70 millimeters. More desirably, the pieces may have a length ranging from about 10 to about 100 millimeters and a width ranging from about 3 to about 20 millimeters. Importantly, the pieces should be sized so they can be suspended in a liquid such as water. It is contemplated that aqueous solutions, solvents, emulsions and the like may also be used.

In an aspect of the invention, the step of providing discrete pieces of bonded fibrous materials include a process operation to reduce the size of unitary bonded fibrous materials such as large fabrics, textiles, webs and the like or large segments or scraps of such fabrics, textiles, webs, etc. into discrete pieces that are adapted for suspension in a liquid. The operation may be a conventional operation such as, for example, mechanical shredding, mechanical cutting, mechanical tearing, mechanical grinding, water jet cutting, laser cutting, garnetting and combinations thereof.

In another aspect of the invention, the mechanical work may be applied to the liquid suspension utilizing a combination of blades mounted on a rotating roll and blades mounted on a fixed plate to generate areas of very high hydraulic pressure and mechanical shear stress. Such a combination may be found in equipment for processing fiber slurries such as, for example, beaters and refiners, that can supply sufficient energy to the suspension to control fiber length under conditions that provide a high level of fiber to metal interaction.

The blades may be mounted on the fixed plate that can be aligned at an angle in at least one dimension with respect to the direction or plane of rotation of the rotating blades. For example, the fixed blades may be mounted so they are at an angle of between about 5 degrees and 70 degrees to the direction or plane of rotation of the rotating blades. Desirably, the fixed blades may be mounted so they are at an angle of between about 15 and 55 degrees. More desirably, the fixed blades may be mounted so they are at an angle of between about 40 and 50 degrees. Even more desirably, the blades may be mounted so they are at an angle of about 45 degrees.

According to the present invention, the process may be set up so that the mechanical work is applied to the suspension in multiple stages. For example, the mechanical work may be applied to the suspension utilizing a first stage under conditions to generate hydraulic pressure and mechanical shear stress sufficient to wet the pieces of bonded fibrous materials and separate at least some portions of fibers and fiber-like components from the bonded materials. Then additional mechanical work may be applied utilizing a second stage under conditions to generate hydraulic pressure and mechanical shear stress conditions sufficient to rupture the bonded fibrous materials, fibers and fiber-like components into substantially individual fibers and fiber-like components.

In an aspect of the invention, the clearance between the rotating blades and the fixed blades at the closest point during the first stage is between about 20 millimeters and about 100 millimeters. The clearance is between about 1 millimeter (or as close as possible without metal to metal contact) and about 20 millimeters during the second stage. Desirably, the clearance between the rotating blades and the fixed blades at the closest point during the first stage is between about 20 millimeters and about 50 millimeters and between about 1 millimeter and about 10 millimeters during the second stage.

The consistency of the suspension, speed of rotation of the rotating roll and blades, dimensions of the blades, weight and/or pressure load against the rotating roll are variables that may be adjusted in order to control the clearance.

According to the invention, the approximate amount of mechanical work applied to the liquid suspension may be greater than about 3 Horsepower—day (24 hours) per dry ton of bonded fibrous material—as determined by measuring the electric current drawn by the motor providing movement to the components generating hydraulic pressure and shear stress conditions. This number may be greater than 4 Horsepower—day per ton and may be even greater than 6 or more. It is contemplated that, in some situations or under some conditions, the approximate amount of mechanical work may be less than 3 Horsepower—day per dry ton of bonded fibrous material.

The process of the present invention is practiced using bonded fibrous materials selected from woven fabrics, knitted fabrics, nonwoven webs and combinations thereof. Generally speaking, these nonwoven webs are webs that are thermally bonded, adhesively bonded, mechanically entangled, solvent bonded, hydraulically entangled and combinations thereof.

The bonded fibrous materials can be composed of synthetic fibrous materials, natural fibrous materials and combinations thereof. The synthetic fibrous material may include thermoplastic fibers and filaments.

According to an aspect of the invention, the bonded fibrous materials may be recycled into substantially individual fibers and fiber-like components having a relatively uniform length distribution. For example, the fiber and fiber-like material may have a length distribution that spans approximately 7 millimeters. Desirably, the fiber and fiber-like material may have a length distribution that spans approximately 5 millimeters. It is contemplated that the fiber and fiber-like material may have a length distribution that spans less than 5 millimeters, for example, from 2 to 4 millimeters.

The present invention encompasses recycled synthetic fibers and fiber-like materials having at least one thread element composed of synthetic material having at least one irregular distortion generated by hydraulic fracture of the thread element to separate it from a bonded fibrous material while the bonded fibrous material is suspended in a liquid.

The thread element may have a length ranging from about 1 millimeter to about 15 millimeters. For example, the thread element may have a length ranging from about 1.5 to about 10 millimeters. As another example, the thread element may have a length ranging from about 2 to about 5 millimeters. The thread element may have a diameter of less than 100 micrometers. For example, the thread element may have a diameter of less than 30 micrometers.

According to an aspect of the invention, the irregular distortions may be in the form of bends in the thread element, flattened segments of thread element, expanded segments of thread element and combinations thereof.

Generally speaking, the irregular distortions cause the thread elements of the recycled materials to have greater surface area than thread elements in the bonded fibrous material prior to hydraulic fracture of the thread element to separate it from the bonded fibrous material. For example, the surface areas of the recycled thread elements are at least about 5 percent greater.

In an embodiment of the invention, the recycled synthetic fibers and fiber-like materials may be a synthetic material that is a synthetic thermoplastic material. For example, the synthetic thermoplastic material may be a polyolefin such as polypropylene, polyethylene and combinations of the same. The synthetic thermoplastic material may be in the form of multicomponent fibers, filaments, strands or the like and may include fiber and/or filaments having various cross-sectional shapes, lobes or other configurations.

The present invention encompasses a nonwoven fibrous web comprising the recycled synthetic fibers and fiber-like material described above. The web may be formed utilizing various web forming processes such as wet forming or wet laying, dry forming, air-laying, foam forming and combinations thereof.

The nonwoven fibrous web may further include non-recycled natural fibrous materials, non-recycled natural synthetic materials, recycled natural fibrous materials, particulate materials and combinations thereof.

Definitions

The term "machine direction" as used herein refers to the direction of travel of the forming surface onto which fibers are deposited during formation of a nonwoven web including, but not limited to spunbond webs, meltblown fiber webs, and paper.

The term "cross-machine direction" as used herein refers to the direction that is perpendicular to the machine direction defined above.

The term "pulp" as used herein refers to fibers from natural sources such as woody and non-woody plants. Woody plants include, for example, deciduous and coniferous trees. Non-woody plants include, for example, cotton, flax, esparto grass, milkweed, straw, jute, hemp, and bagasse.

The term "average fiber length" as used herein refers to an average length of fibers, fiber bundles and/or fiber-like materials determined by measurement utilizing microscopic techniques. A sample of at least 20 randomly selected fibers is separated from a liquid suspension of fibers. The fibers are set up on a microscope slide prepared to suspend the fibers in water. A tinting dye is added to the suspended fibers to color cellulose-containing fibers so they may be distinguished or separated from synthetic fibers. The slide is placed under a Fisher Stereomaster II Microscope S19642/S19643 Series. Measurements of 20 fibers in the sample are made at 20× linear magnification utilizing a 0-20 mils scale and an average length, minimum and maximum length, and a deviation or coefficient of variation are calculated. In some cases, the average fiber length will be weighted average length of fibers (e.g., fibers, fiber bundles, fiber-like materials) determined by equipment such as, for example, a Kajaani fiber analyzer model No. FS-200 available from Kajaani Oy Electronics, Kajaani, Finland. According to a standard test procedure, a sample is treated with a macerating liquid to ensure that no fiber bundles or shives are present. Each sample is disintegrated into hot water and diluted to an approximately 0.001% suspension. Individual test samples are drawn in approximately 50 to 100 ml portions from the dilute suspension when tested using the standard Kajaani fiber analysis test procedure. The weighted average fiber length may be an arithmetic average, a length weighted average or a weight weighted average and may be expressed by the following equation:

$$\sum_{x_i=0}^{k}(x_i*n_i)n$$

where k=maximum fiber length
$x_i$=fiber length
$n_i$=number of fibers having length $x_i$
n=total number of fibers measured.

One characteristic of the average fiber length data measured by the Kajaani fiber analyzer is that it does not discriminate between different types of fibers. Thus, the average length represents an average based on lengths of all different types, if any, of fibers in the sample.

As used herein, the term "spunbonded filaments" refers to small diameter continuous filaments which are formed by extruding a molten thermoplastic material as filaments from a plurality of fine, usually circular, capillaries of a spinneret with the diameter of the extruded filaments then being rapidly reduced as by, for example, eductive drawing and/or other well-known spun-bonding mechanisms. The production of spun-bonded nonwoven webs is illustrated in patents such as, for example, in U.S. Pat. No. 4,340,563 to Appel et al., and U.S. Pat. No. 3,692,618 to Dorschner et al. The disclosures of these patents are hereby incorporated by reference.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "microfibers" means small diameter fibers having an average diameter not greater than about 100 microns, for example, having a diameter of from about 0.5 microns to about 50 microns, more particularly, microfibers may have an average diameter of from about 4 microns to about 40 microns.

As used herein, the term "thermoplastic material" refers to a high polymer that softens when exposed to heat and returns to generally its un-softened state when cooled to room temperature. Natural substances which exhibit this behavior are crude rubber and a number of waxes. Other exemplary thermoplastic materials include, without limitation, polyvinyl chlorides, some polyesters, polyamides, polyfluorocarbons, polyolefins, some polyurethanes, polystyrenes, polyvinyl alcohols, caprolactams, copolymers of ethylene and at least one vinyl monomer (e.g., poly(ethylene vinyl acetates), copolymers of ethylene and n-butyl acrylate (e.g., ethylene n-butyl acrylates), and acrylic resins.

As used herein, the term "non-thermoplastic material" refers to any material which does not fall within the definition of "thermoplastic material," above.

DESCRIPTION OF THE INVENTION

The present invention is directed to a method of recycling bonded fibrous materials into substantially individual fibers and fiber-like materials. The method of the present invention may be practiced utilizing bonded fibrous materials that include synthetic fibers. The process of the present invention may be practiced using bonded fibrous materials such as, for example, woven fabrics, knitted fabrics, nonwoven webs and combinations thereof. Generally speaking, bonded fibrous materials in the form of nonwoven webs are webs that are thermally bonded, adhesively bonded, mechanically entangled, solvent bonded, hydraulically entangled and/or combinations of such techniques.

The bonded fibrous materials can be composed of synthetic fibrous materials, natural fibrous materials and combinations thereof. The synthetic fibrous material may include thermoplastic fibers and filaments.

The method includes the steps of: (a) providing pieces of bonded fibrous materials, the pieces having sizes that are adapted for suspension in a liquid; (b) suspending the discrete pieces of bonded fibrous materials in a liquid; (c) applying mechanical work to the liquid suspension of discrete pieces to generate hydraulic pressure and mechanical shear stress conditions sufficient to hydraulically fragment the bonded fibrous materials into fibers and fiber-like components; and (4) separating substantially individual fibers and fiber-like components from the liquid.

According to the invention, the step of providing discrete pieces of bonded fibrous materials may be in the form of a conventional operation such as, for example, mechanical shredding, mechanical cutting, mechanical tearing, mechanical grinding, water jet cutting, laser cutting, garnetting and combinations thereof.

Figure 1:
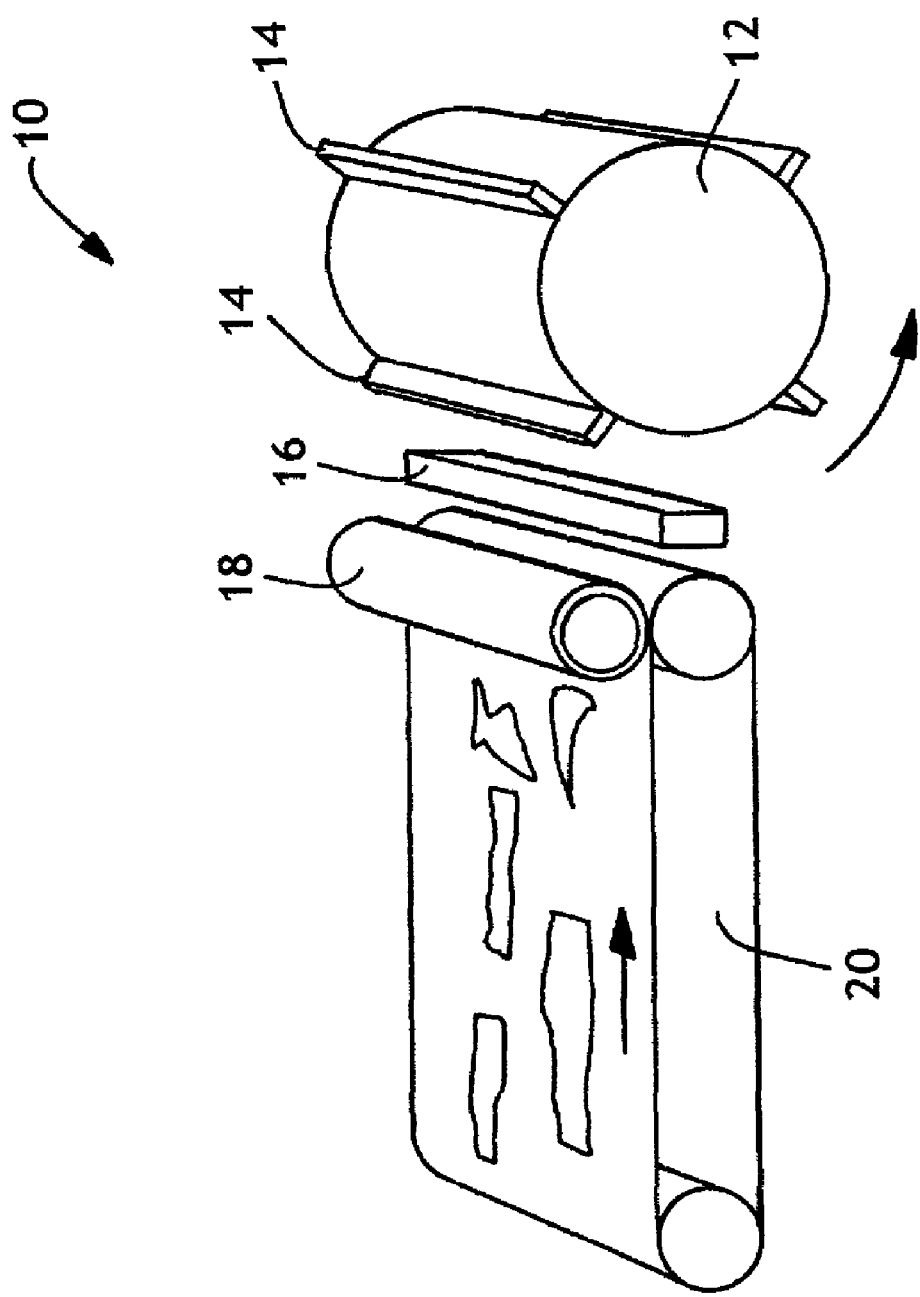
FIG. 1 is a schematic representation of an exemplary process for shredding a bonded fibrous material.

Referring now to FIG. 1, there is shown an exemplary mechanical shredding operation 10. The shredding machine includes a knife roll 12 having a series of knife blades 14. The roll 12 rotates generally in the direction of the arrow associated therewith. The knife blades 14 are desirably mounted at an angle or inclination to the centerline of the roll to create a "scissors-cut" action as the knife blades 14 come in contact with a fixed knife 16. A press roll 18 may be used in combination with a belt conveyor 20 to feed material. The speeds of the conveyor 20 and the knife roll 12 may be set independently to control the size of the pieces produced by the operation. Of course, other types of shredding equipment may be used. For example, "bear-claw" type shredders that utilize teeth or bits that rip and tear the bonded fibrous material are satisfactory.

Generally speaking, the pieces of bonded fibrous material may have a length ranging from about 10 to about 350 millimeters and a width ranging from about 3 to about 70 millimeters. Importantly, the pieces should be sized so they can be suspended in a liquid such as water. It is contemplated that the liquid may, in some cases, be an aqueous solution, and may include additives such as surfactants, treatments, dyes, caustics, solvents, emulsions and the like.

According to the invention, mechanical work is applied to the liquid suspension at levels that generate conditions of hydraulic pressure and shear stress sufficient to fragment, rupture, rupture, burst or disintegrate pieces of bonded fibrous materials into useful free fibers and fiber bundles or fiber-like materials. Generally speaking, process conditions used to convert the shredded material to recycled fibers are more aggressive and stringent than those found in conventional pulping operations. These conditions include passing the shredded pieces through a zone of increasing high hydraulic pressure and high mechanical shear stress.

As an example, normal pulping operations typically use less than about 3 horsepower—day (24 hours) per dry ton of material. Embodiments of the present invention may utilize much larger inputs of energy. For example, the method of the invention may be practiced utilizing 35% more energy; 50% percent more energy, or even more to separate useful free fibers and fiber bundles from the bonded fibrous material.

Although the inventors should not be held to a particular theory of operation, it is believed that the combination of hydraulic pressure and shear stress breaks up the material into free fibers and fiber bundles. It is also thought that the content of free fibers and the average size of the bundles can be controlled by varying the pressure and mechanical stress.

It is generally thought that this high level of mechanical action or work is possible without causing significant degradation of the synthetic components of the bonded fibrous materials (e.g., without melting synthetic thermoplastic material) because the water/liquid in the process absorbs the heat generated as free fibers and fiber-like materials are separated from the bonded fibrous material.

Generally speaking, conventional beating and/or refining equipment is used to modify cellulose fibers to develop papermaking properties of hydration and fibrillation. According to the present invention, conventional beaters and/or refiners may be configured or operated in an unconventional manner to provide the hydraulic pressure and shear stress conditions sufficient to fragment and fracture the bonded fibrous material into free fibers, fiber bundles and fiber-like materials.

Figure 2A:
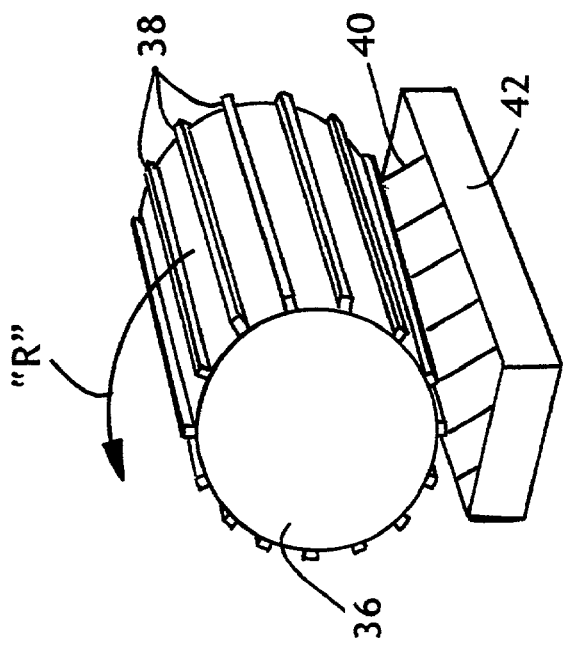
FIG. 2A is a detail of the exemplary process shown in FIG. 2.
Figure 2:
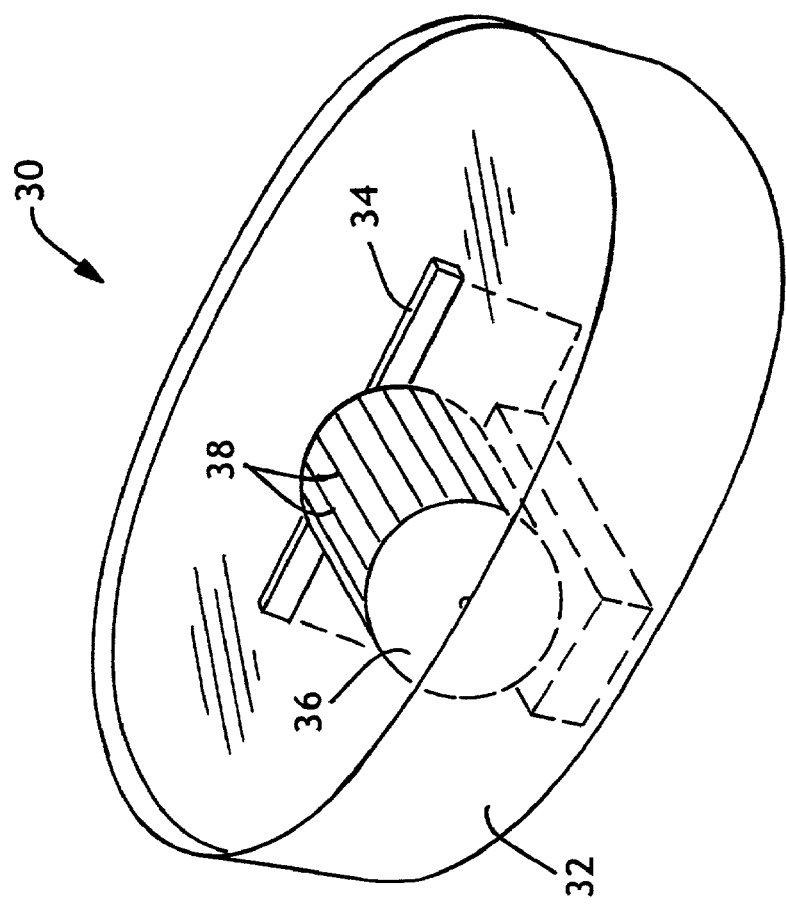
FIG. 2 is a schematic representation of an exemplary process for hydraulically fragmenting shredded pieces of a bonded fibrous material.

Exemplary beater devices are available from manufacturers such as Beloit Jones, E. D. Jones, Valley, and Noble & Wood. Referring now to FIGS. 2 and 2A of the drawings, there is shown an exemplary Hollander-type beater device 30 that may be used in the practice of the present invention. The beater includes an oval vat 32 with a central wall 34 and a cylinder roll 36 equipped with blades or vanes 38 that moved past a second set of blades 40 mounted on a platen or fixed plate 42. The blades 40 may be mounted on the fixed plate so that they can be aligned at an angle in at least one dimension with respect to the direction or plane of rotation "R" of the rotating blades 38. For example, the fixed blades 40 may be mounted so they are at an angle of between about 5 degrees and 70 degrees to the direction or plane of rotation "R" of the rotating blades 38. As another example, the fixed blades may be mounted so they are at an angle of between about 15 and 55 degrees, between about 40 and 50 degrees, or even about 45 degrees.

A liquid suspension of bonded fibrous material pieces is introduced into the beater device. Alternatively and/or additionally, bonded fibrous material pieces may be introduced directly into liquid in the beater vat. Various proportions of bonded fibrous materials and water may be used and appropriate proportions may be determined by one of skill in the art.

During operation, the cylinder roll 36 is rotated so that sufficient hydraulic pressure and shear stress is produced between the blades or vanes 38 and the blades 40 mounted on the fixed plate. One exemplary cylinder roll had a diameter of 72 inches, a width of 72 inches, 192 blades each having a length of 72 inches and spaced one-half inch apart. Such a roll weighed approximately 16 tons. Generally speaking, the speed of rotation is constant and the variable that is modified is the pressure or load on the roll. The roll is mounted such that a gauge pressure reading of 0 psi corresponds to very little or no portion of the weight of the roll (~0 tons) counteracting the pressure generated by fibers and pieces of bonded fibrous material as they are squeezed through the gap existing between the blades at the bottom of the rotating roll and the fixed blades mounted underneath the roll. A gauge pressure reading of 50 psi corresponds to approximately one-half of the weight of the roll (~8 tons) counteracting the pressure generated by fibers and pieces of bonded fibrous material as they squeeze through the gap between the blades at the bottom of the rotating roll and the fixed blades mounted underneath the roll. A gauge pressure reading of 100 psi corresponds to approximately the full weight of the roll (~16 tons) counteracting the pressure generated by fibers and pieces of bonded fibrous material as they squeeze through the gap existing between the blades at the bottom of the rotating roll and the fixed blades mounted underneath the roll.

Rotation speed, consistency of the suspension in the vat and clearance between the rotating blades or vanes 38 and the fixed blades 40 is also adjusted to conditions that enhance "metal to fiber" interaction that cuts or controls the length of free fibers, fiber bundles and fiber-like particles. The term "metal to fiber" interaction is used to describe the contact between the bonded fibrous material and the fixed and/or rotating blades that may occur under conditions of hydraulic pressure and mechanical shear stress sufficient to sever, cut or break long fibers. According to the invention, this interaction should be controlled to cut long fibers without materially affecting or lowering the length and/or freeness of pulp or short fibers that may be present in the suspension. For example, operating equipment utilizing lower than conventional consistencies, larger blade dimensions, closer tolerances between rotating blades and fixed blades, and/or higher rotational speeds may enhance "metal to fiber" interaction. Generally speaking, the present invention utilizes operating conditions and/or equipment that provide large numbers of working edges to act on the suspended fiber instead of utilizing primarily "fiber to fiber" interaction.

The method of the present invention provides a technique to recycled bonded fibrous materials into substantially individual fibers and fiber-like components having a relatively low average length and a relatively uniform average length distribution.

While the method of the present invention may be operated to provide fibers, fiber bundles and fiber-like materials having wide range of lengths, it may also be used to generate fiber and fiber-like material having an average length distribution that spans approximately 7 millimeters or less.

In addition to controlling length, some "metal to fiber" interaction may generate deformations and distortions of synthetic components of the bonded fibrous material. While some deformations and distortions may be generated by hydraulic fragmentation of the bonded fibrous material others may be generated by tearing, slicing and breaking of fiber and/or filaments.

Referring now to FIGS. 3, 5-8, and 10-14, there is shown various exemplary recycled synthetic fibers, fiber bundles and/or fiber-like materials having at least one thread element composed of synthetic material having at least one irregular distortion generated by hydraulic fracture of the thread element to separate it from a bonded fibrous material while the bonded fibrous material is suspended in a liquid.

The thread element may have a length ranging from about 1 millimeter to about 15 millimeters. For example, the thread element may have a length ranging from about 1.5 to about 10 millimeters. As another example, the thread element may have a length ranging from about 2 to about 5 millimeters. The thread element may have a diameter of less than 100 micrometers. For example, the thread element may have a diameter of less than 30 micrometers. Generally speaking, these dimensions are similar to certain varieties of commercially available pulps and may be readily blended with commercial pulps. In some embodiments of the invention, the thread elements may have a diameter of less than 10 microns and may even be less than 1 micron.

According to an aspect of the invention, the irregular distortions may be in the form of bends in the thread element, flattened segments of thread element, expanded segments of thread element and combinations thereof.

Generally speaking, the irregular distortions cause the thread elements of the recycled materials to have greater surface area than thread elements in the bonded fibrous material prior to hydraulic fracture of the thread element to separate it from the bonded fibrous material. For example, the surface areas of the recycled thread elements may be at least about 5 percent greater.

Figure 3:
FIG. 3 is a photomicrograph of a detail of an exemplary recycled synthetic fiber.

FIG. 3 is a photomicrograph (approximately 500× linear magnification) showing a detail of an exemplary recycled synthetic fiber. The recycled fiber was recovered from a composite structure containing a thermally point bonded continuous polypropylene filament web and pulp fibers hydraulically entangled with the continuous filament web. The fiber visible in the center of the photomicrograph is a polypropylene thread element having bends in the filaments and a relatively flattened segment. At least a portion of these distortions are generated or exposed by hydraulic fracture of the thread element from the bonded fibrous material (i.e., the composite structure). The material surrounding the thread element is cellulose pulp.

Figure 4:
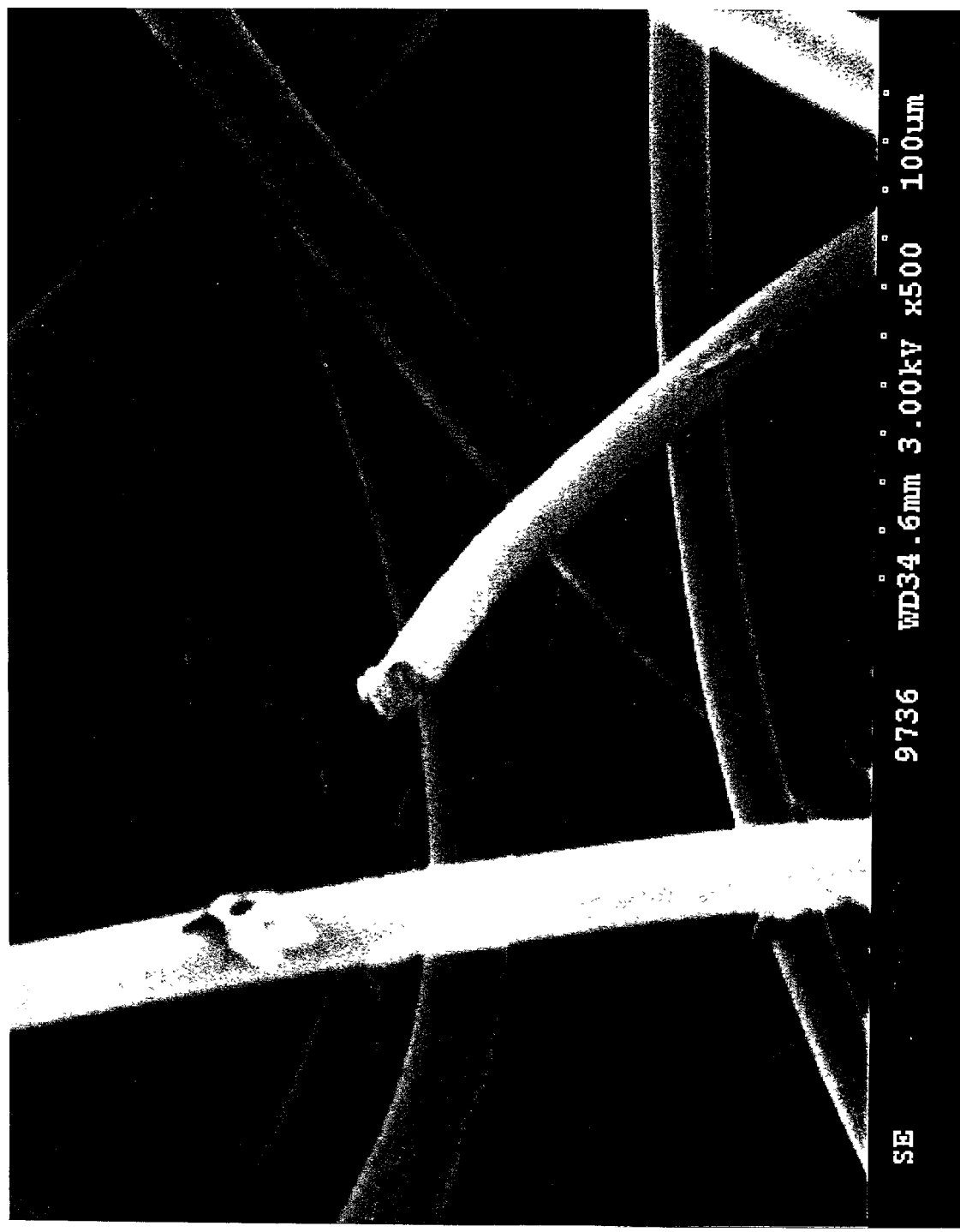
FIG. 4 is a photomicrograph of a detail of an exemplary virgin synthetic staple fiber.

FIG. 4 is a photomicrograph (approximately 500× linear magnification) showing conventional polypropylene staple fibers appearing in a conventional bonded carded web structure. In contrast to the thread elements of FIG. 3, these fibers appear relatively free of irregular distortions. The fibers have relatively smooth surfaces, even or uniform diameters, and lack the twists, bends and other irregular distortions that are evident in the thread element shown in FIG. 3.

Figure 5:
FIG. 5 is a photomicrograph of a detail of an exemplary recycled synthetic fiber.

FIG. 5 is a photomicrograph (approximately 120× linear magnification) showing a detail of an exemplary recycled synthetic fiber recovered from the same type of composite structure as the thread element shown in FIG. 3. The fiber visible across the central region of the photomicrograph is a polypropylene thread element that exhibits a loop and bends as well as relatively flattened segments. At least a portion of these distortions are generated or exposed by hydraulic fracture of the thread element from the bonded fibrous material (i.e., the composite structure). The material surrounding the thread element is cellulose pulp.

Figure 6:
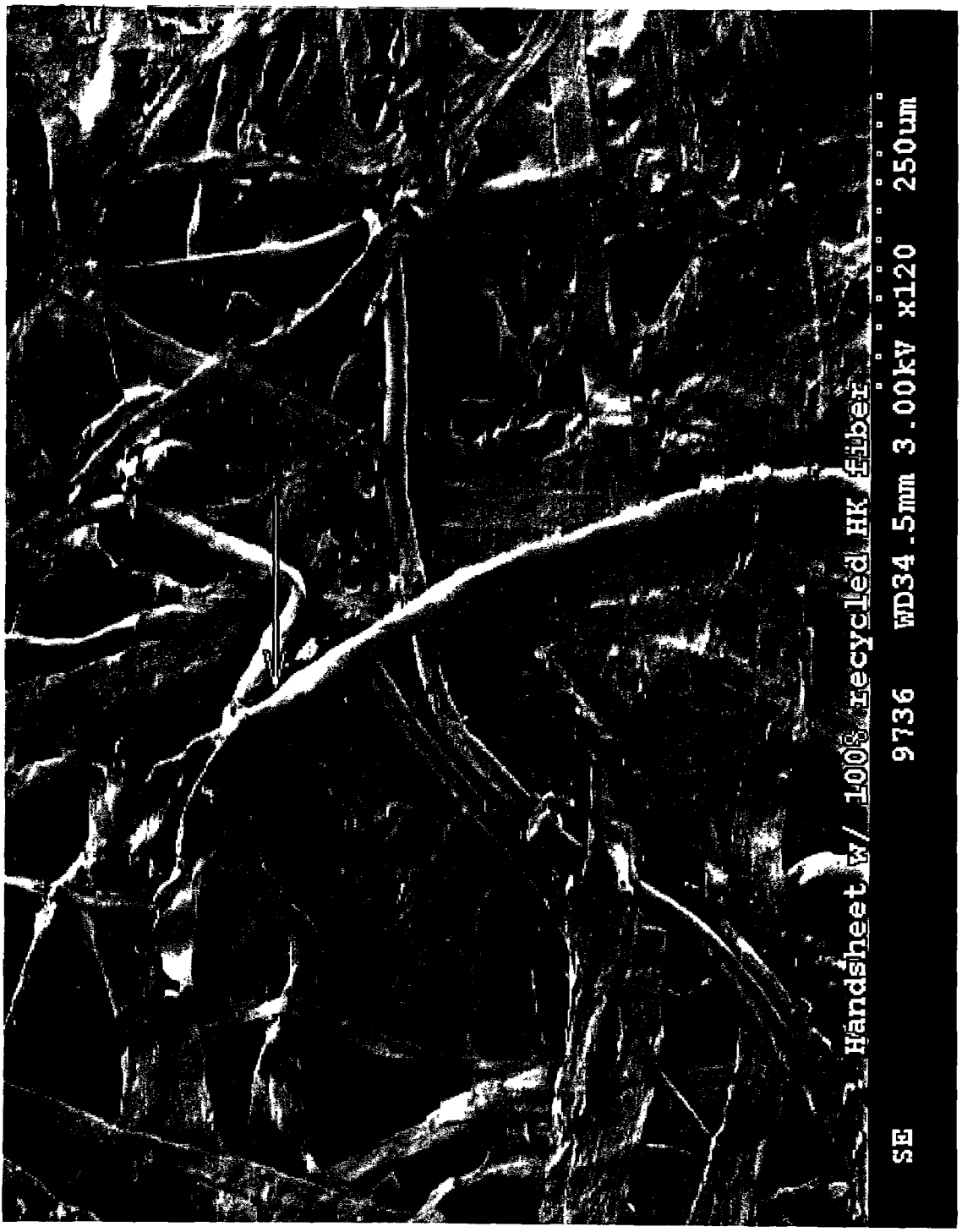
FIG. 6 is a photomicrograph of a detail of an exemplary recycled synthetic fiber.

FIG. 6 is a photomicrograph (approximately 120× linear magnification) showing a detail of an exemplary recycled synthetic fiber recovered from the same type of composite structure as the thread element shown in FIG. 3. The fiber visible in the center of the photomicrograph is a polypropylene thread element. The arrow in the photomicrograph points to a sharp bend in the thread element.

Figure 7:
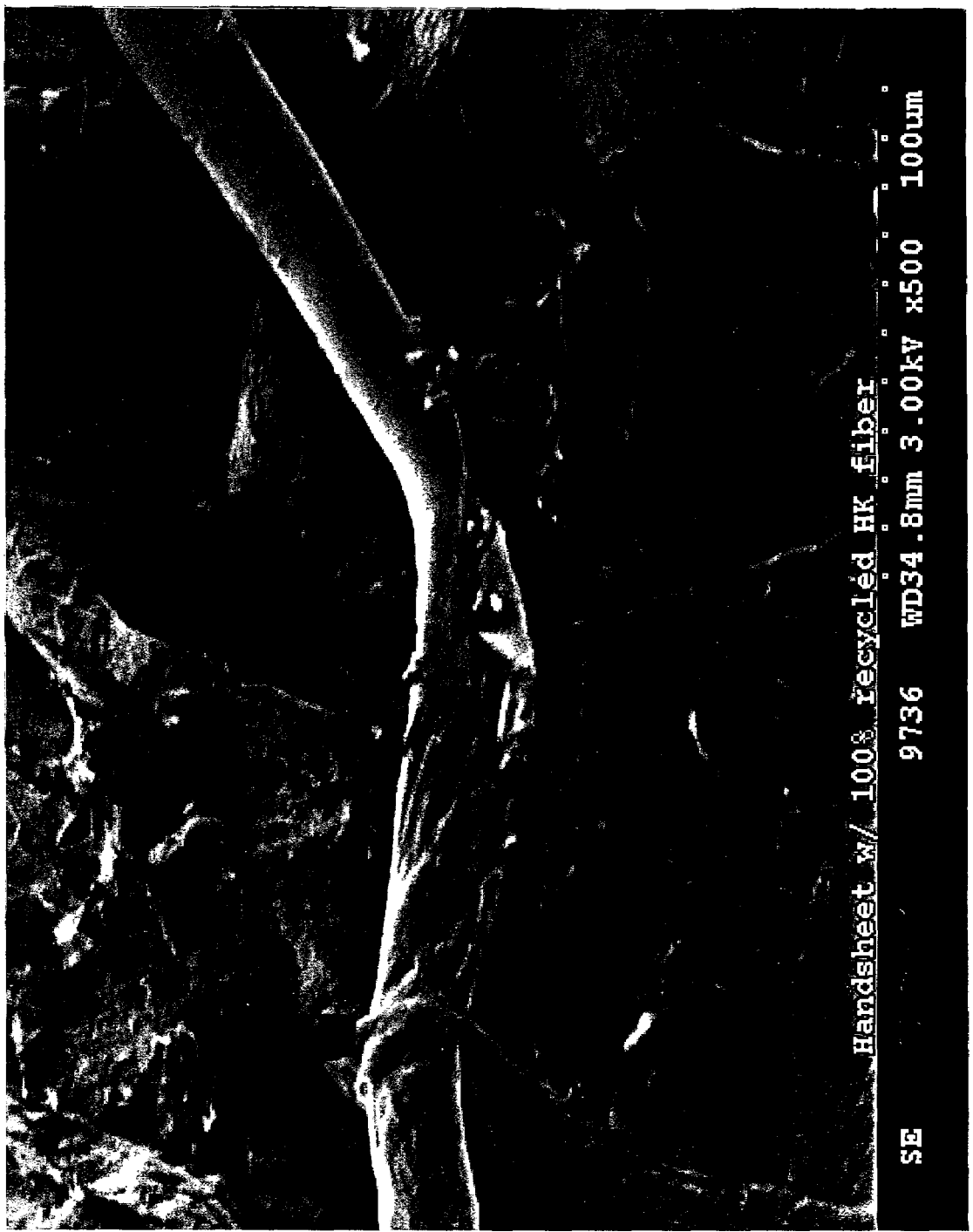
FIG. 7 is a photomicrograph of a detail of an exemplary recycled synthetic fiber.

FIG. 7 is a photomicrograph (approximately 500× linear magnification) showing a detail of an exemplary recycled synthetic fiber recovered from the same type of composite structure as the thread element shown in FIG. 3. The fiber visible in the center of the photomicrograph is a polypropylene thread element that exhibits bends as well as a roughened segment.

Figure 8:
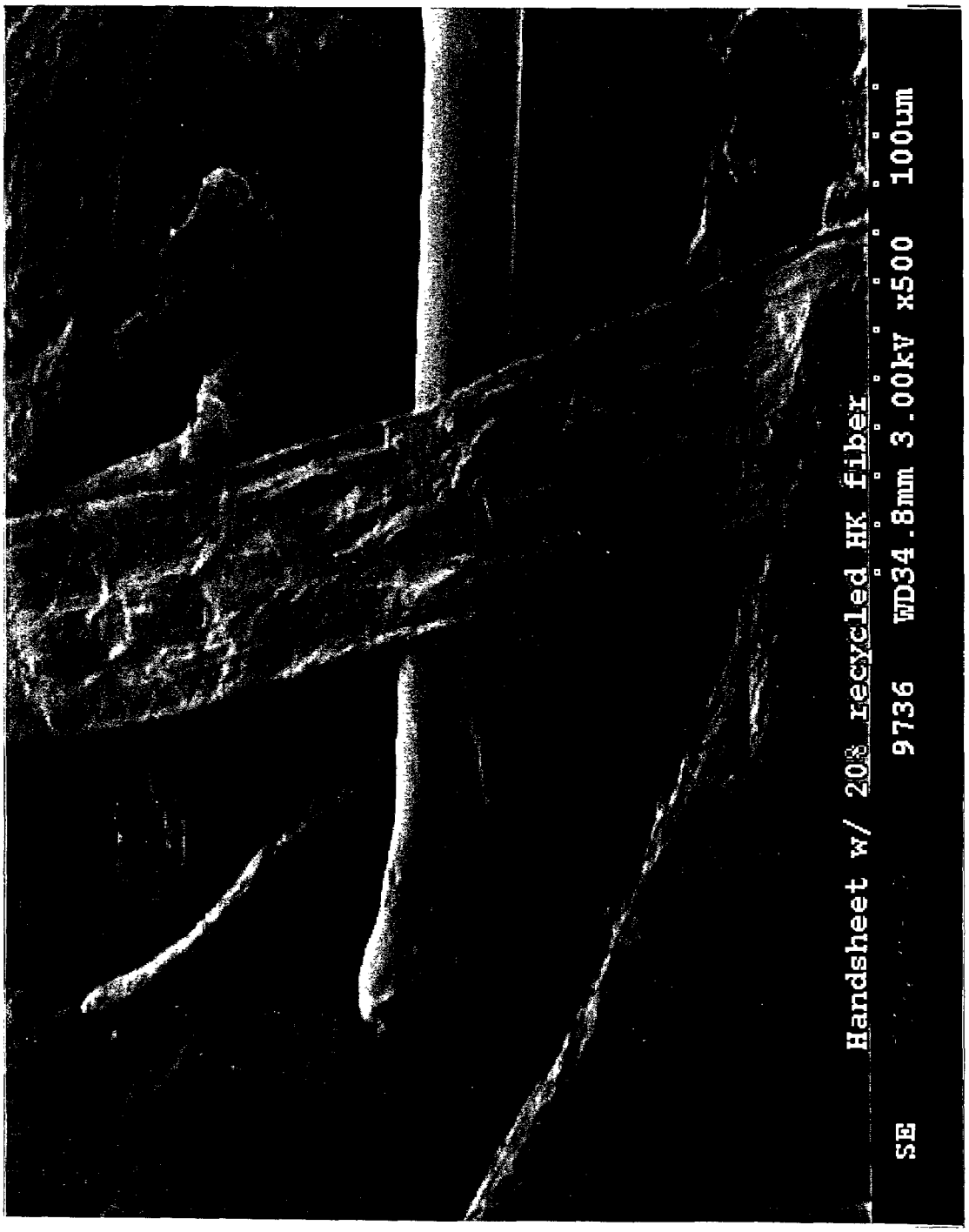
FIG. 8 is a photomicrograph of a detail of an exemplary recycled synthetic fiber.

FIG. 8 is a photomicrograph (approximately 500× linear magnification) showing a detail of an exemplary recycled synthetic fiber recovered from the same type of composite structure as the thread element shown in FIG. 3. The fiber visible across the center of the photomicrograph is a polypropylene thread element showing a cut end of the fiber that is flattened and expanded.

Figure 9:
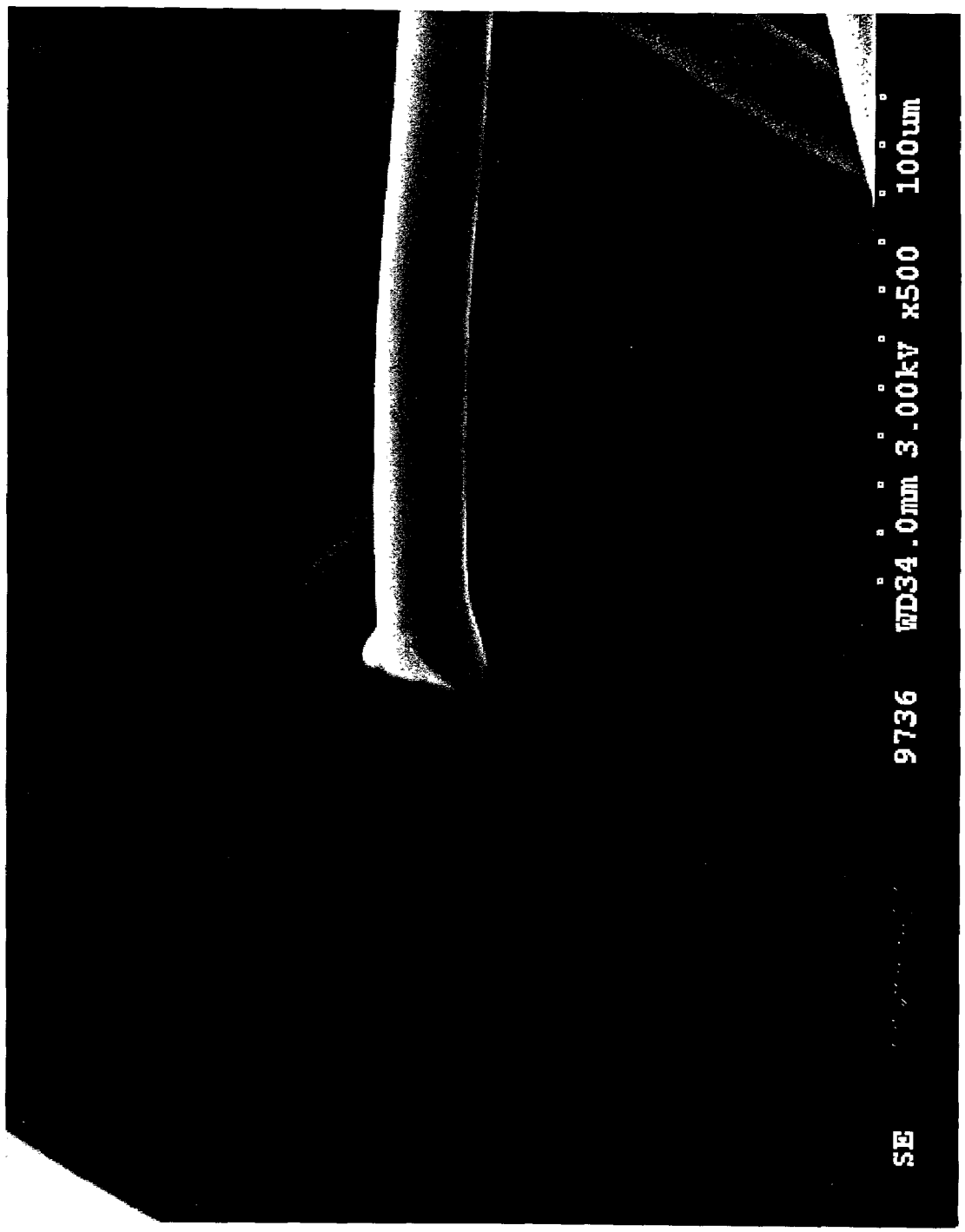
FIG. 9 is a photomicrograph of a detail of an exemplary virgin synthetic staple fiber.

FIG. 9 is a photomicrograph (approximately 500× linear magnification) showing a detail of a conventional polypropylene staple fiber. In contrast to the thread element of FIG. 8, the fiber appears relatively free of irregular distortions and has an end that appears to be cut cleanly without evidence of expansion or other distortion.

Figure 10:
FIG. 10 is a photomicrograph of a detail of multiple exemplary recycled synthetic fibers.

FIG. 10 is a photomicrograph (approximately 250× linear magnification) showing a detail of two exemplary recycled synthetic fibers recovered from the same type of composite structure as the thread element shown in FIG. 3. The fibers visible across the center and near the lower portion of the photomicrograph are polypropylene thread elements that exhibit bends as well as roughened segments.

Figure 11:
FIG. 11 is a photomicrograph of a detail of an exemplary recycled synthetic fiber.

FIG. 11 is a photomicrograph (approximately 500× linear magnification) showing a detail of exemplary recycled synthetic fibers. The recycled fibers were recovered from Kimtex® brand wiper containing thermally point-bonded web of polypropylene meltblown fibers. The relatively fine meltblown fibers visible in the center of the photomicrograph are polypropylene thread elements having bends, twists, tangles and relatively flattened segments. At least a portion of these distortions are generated or exposed by hydraulic fracture of the thread elements from the bonded fibrous material (i.e., the Kimtex® wiper). The material surrounding the thread elements is cellulose pulp.

Figure 12:
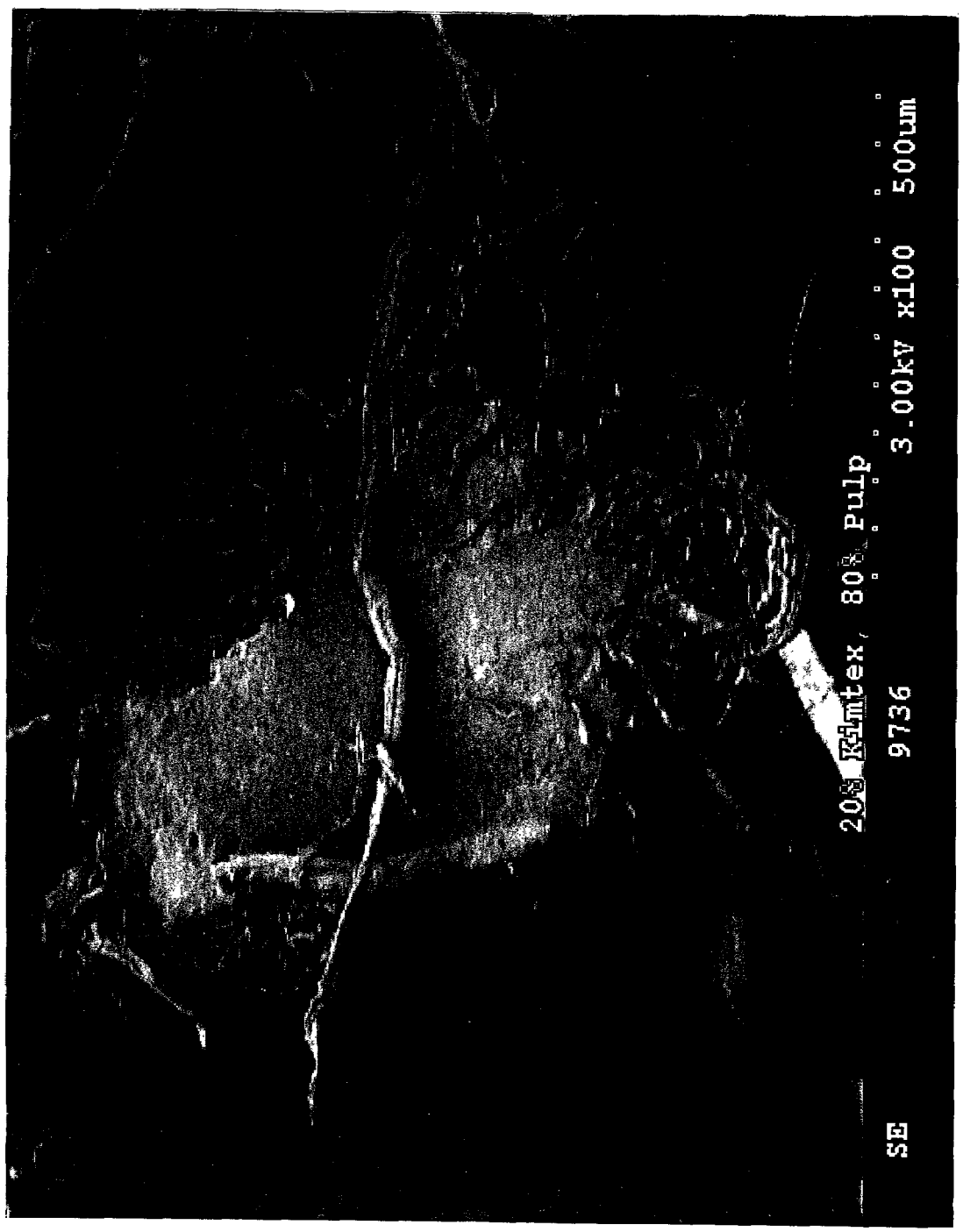
FIG. 12 is a photomicrograph showing details of exemplary recycled synthetic fibers.

FIG. 12 is a photomicrograph (approximately 100× linear magnification) showing a detail of exemplary recycled synthetic fibers recovered from the same type of material as the thread elements shown in FIG. 11. A bond point approximately 500 micrometers in length is visible in the center of the photomicrograph. Fibers radiate outward from the edges of the bond point in the form of polypropylene thread elements having bends, twists, tangles and relatively flattened segments. At least a portion of these distortions are generated or exposed by hydraulic fracture of the thread elements from the bonded fibrous material. Some of the material in the background of the thread elements is cellulose pulp.

Figure 13:
FIG. 13 is a photomicrograph showing details of exemplary recycled synthetic fibers.

FIG. 13 is a photomicrograph (approximately 500× linear magnification) showing a detail of exemplary recycled synthetic fibers recovered from the same type of material as the thread elements shown in FIG. 11. A larger fiber-like material or fiber bundle is approximately 40 micrometers in width is visible in the center of the photomicrograph. Fibers surround and radiate outward from the edges of the fiber-like material or fiber bundle in the form of polypropylene thread elements having bends, twists, tangles and relatively flattened segments. At least a portion of these distortions are generated or exposed by hydraulic fracture of the thread elements from the bonded fibrous material. The larger fibrous materials near the thread elements are cellulose pulp fibers.

Figure 14:
FIG. 14 is a photomicrograph showing details of exemplary recycled synthetic fibers.

FIG. 14 is a photomicrograph (approximately 500× linear magnification) showing a detail of exemplary recycled synthetic fibers recovered from the same type of material as the thread elements shown in FIG. 11. A mix of cellulose pulp and recycled fibers in the form of polypropylene thread elements having bends, twists, tangles and relatively flattened segments is shown.

In an embodiment of the method of the present invention, mechanical work may be applied to a suspension of cut or shredded pieces of bonded fibrous material in multiple stages. As an example, mechanical work may be applied to a suspension of pieces of bonded fibrous material utilizing a Hollander-type beater or similar device under conditions to wet the pieces of bonded fibrous materials and separate at least some portions of fibers and fiber-like components from the bonded materials. In some situations, bonded fibrous materials containing a mix of natural and synthetic fibers and/or very short and very long fibers (e.g., pulp fibers and continuous synthetic filaments) may be partially or substantially separated in one or more initial treatment stages.

After such treatment, the short and longer fiber/filament streams may be separated. If a Hollander-type beater is used to carry out the first stages or stages of treatment, the gap or clearance between the rotating blades and the fixed blades may be sufficiently large to enhance "fiber to fiber" or "fibrous material to fibrous material" interaction rather than "metal to fiber" interaction. As an example, under conventional conditions the clearance between the rotating blades and fixed blades may be between about 20 millimeters and about 100 millimeters. It is contemplated that other variables such as consistency of the suspension, speed of beater roll rotation and/or pressure load applied to the beater roll may also be adjusted to enhance treatment in the first stage (or stages).

In a second stage, additional mechanical work may be applied under conditions to generate hydraulic pressure and mechanical shear stress conditions sufficient to rupture the bonded fibrous materials, fibers and fiber-like components into substantially individual fibers and fiber-like components. If a Hollander-type beater is used to carry out the second stage (or second stages) of treatment, the gap or clearance between the rotating blades and the fixed blades will desirably be sufficiently small to enhance "metal to fiber" or "metal to fibrous material" interaction that can occur under conditions of hydraulic pressure and mechanical shear stress to sever, cut or break long fibers (i.e., long synthetic fibers) without materially affecting or lowering the length and/or freeness of pulp or short fibers that may be present in the suspension. As an example, the clearance may be between about 1 millimeter (or as close as possible without "metal to metal" contact) and about 20 millimeters. It is contemplated that other variables such as consistency of the suspension, speed of beater roll rotation and/or pressure load applied to the beater roll may also be adjusted to enhance treatment in the second stage (or stages).

According to the invention, the amount of mechanical work applied to the liquid suspension is greater than about 3 Horsepower—day (24 hours) per dry ton of bonded fibrous material. This number may desirably be greater than 6 Horsepower—day per ton and may be in the range of 10 to about 15 for many exemplary materials.

After the liquid suspension is treated and the bonded fibrous material is hydraulically fragmented into free fibers, fiber bundles and fiber-like materials, these materials may then be introduced into the furnish stream of a wet forming process, or they can be wet lapped for later use, or they can be dried for dry forming processes. It is contemplated that the fiber stream may be screened to removed large pieces, flock and the like.

Generally speaking, bonded scrap or waste materials containing synthetic fibers can be recycled into free fibers, and fiber-like materials that can have increased surface area and may be processed to have a controlled fiber length. Fibers recycled according to the present invention are thought to provide better retention in wet-forming processes and with sufficient quantity, can improve the mechanical and absorbent properties when incorporated into fibrous webs. In addition recycled high surface area fibers offer a significant cost advantage over virgin synthetic staple fibers. Using materials that have been previously formed into fiber networks, then bursting them apart as described above results in fibers and fiber-like materials that generally have increased surface area. This surface area results from the breaking the networks into small segments that still have bond points, bends, twists, curls, open layers of fibers, and flat areas as shown in the various photomicrographs described above.

In addition, the fiber length is controlled by the same mechanical work created during the bursting process. Controlling the length of the fiber will allow them to be used in a number of web forming processes such as wet forming, dry forming, foam forming. For example, by controlling the synthetic fiber length to that of wood pulp fibers, recycled material can be reintroduced into virgin wood pulp furnishes without affecting the handling or processing properties of the furnish.

EXAMPLE 1

This example relates to recycling a bonded and entangled composite material containing natural fibers and synthetic filaments. A composite hydraulically entangled material containing virgin wood pulp and a continuous web of bonded synthetic polypropylene filaments (approximately 20 percent, by weight) (i.e., a spunbond continuous filament web)—available from the Kimberly-Clark Corporation, Roswell, Georgia under the trademarks WORKHORSE® and HYDROKNIT® fast absorbing materials—was shredded into pieces ranging from about 10-350 mm in length and 3-70 mm in width. The composite contained approximately 80% by weight and about 20 percent, by weight, polypropylene filaments. The material was shredded utilizing a shredder available from the East Chicago Machine Tool Company of East Chicago, Ind. The pieces were transferred to a conventional Hollander-type industrial beater manufactured by E. D. Jones & Sons, Pittsfield, Mass. The beater was a "Number 3 Jones Beating Unit" equipped with a 45 degree diagonal bed plate. The beater had a rotating roll with blades or vanes generally aligned on the roll as shown in FIG. 2A. The blades or vanes were approximately ¼ inch (~6 mm) wide, approximately ½ inch (~12 to 13 mm) high. These were spaced approximately ½ inch (~12 to 13 mm) apart on the exterior of the roll perpendicular to the direction or plane of rotation. A fixed plate was mounted just below the rotating roll and was equipped with blades or "knives" that were approximately ⅛ inch (~3 mm) wide, ¼ inch (~6 mm) high, spaced approximately ⅜ inches (~9 to 10 mm) apart. These were aligned at an angle of 45 degrees to the direction or plane of rotation generally as show in FIG. 2A.

Water was added to the shredded material and hydraulic pressure and shear stress was applied to the material in the Hollander-type beater in two stages. Hydraulic pressure and shear stress was controlled by adjusting the load on the roll as it rotated. In this particular arrangement, hydraulic pressure and shear stress is generated by a "paddle wheel" type pumping action produced when the beater roll rotates and its attached blades or vanes force liquid and wet material against a fixed plate with blades mounted diagonally to the direction or plane of rotation. Generally speaking, a greater load applied to the rotating roll produces less clearance between the rotating roll and the fixed plate. This corresponds to greater levels of hydraulic pressure and shear stress.

During the first stage, the pressure or load against the rotating roll was 0 pounds per square inch (psi) for 10 minutes. Essentially, no load was applied and the "paddle wheel" action of the rotating roll squeezed the pieces in the suspension through a gap of about 1 cm or more between blades of the rotating roll and blades mounted on the fixed plate. Generally speaking, the first stage was used to wet the shredded material and separate the natural fibers from the synthetic fibers. The consistency was adjusted to be about 3.3 percent (the percentage by weight of air or oven dry fibrous material in the suspension).

During the second stage, conditions were adjusted to establish small zones of very high hydraulic pressure and shear stress between the moving blades on the rotating roll and fixed blades near or at their closest point of contact. These small zones are thought to generate a micro-bursting action on the shredded bonded fibrous material to hydraulically fragment and/or blow apart and reduce the resulting synthetic fiber length. In addition, the hydraulic fragmentation and "metal to fiber" or "metal to bonded fibrous material" contact alters the length of the longer synthetic filaments so they have the same length as the natural (i.e., pulp) fibers ranging from about 0.8 to about 3.5 mm without materially lowering the length or freeness of pulp fibers that may be present in the suspension.

In the second stage, pressure on the gauge for the rotating roll was increased to 50 psi and the clearance between the blades of the rotating roll and the fixed plates decreased to between 1 and 10 mm and the approximately one-half of the weight of the 16 ton roll (~8 tons) was available to counteract the pressure generated by pieces as they were squeezed through the gap between the roll and the fixed plate. These conditions were maintained for 50 minutes.

After treatment, free fiber, fiber bundles and fiber-like materials were separated from the suspension. Samples were examined microscopically and natural or pulp fibers were separated and measured separately from the synthetic fibers. In this example, average fiber length was determined as previously described—by manually separating a random sample of 20 synthetic fibers and 20 pulp fibers, measuring the length of individual fibers utilizing a microscope, and then calculating an average length. The resulting recycled fibers and fiber-like materials had the following characteristics:

The average length of the synthetic fiber was approximately the same length as the wood pulp fibers. Average length of the synthetic fibers was 3.78 mm. The length of individual fibers in the sample ranged from 1.65 to 5.33 mm. It should be noted that, prior to processing, the synthetic fibers initially were substantially continuous polypropylene filaments having indeterminate lengths or lengths at least far exceeding 5.33 mm. The average fiber length for the pulp component was 2.7 mm. The length of individual pulp fibers in the sample ranged from 1.35 to 3.81 mm. Measurements taken with a Kajaani FS-200 fiber analyzer indicated an arithmetic average length of 0.76 mm; a length weighted average length of 1.72 mm; and a weight weighted average length of 2.40 mm.

The wood pulp fiber freeness shows a slight reduction (approximately 10 percent—from about 860 mL to about 760 mL) indicating that some additional surface area was developed on the wood pulp fiber component of the composite. However the fiber length was unaffected.

The synthetic fibers have increased or higher surface area as a result of the remaining fiber bond areas, cross overs, and flat areas.

EXAMPLE 2

In this example, recycled fibers were prepared from the same composite hydraulically entangled material containing virgin wood pulp and a continuous web of bonded synthetic polypropylene filaments (i.e., Workhorse® and Hydroknit® fast absorbing materials) utilizing the method set forth in Example 1. The fiber lengths were controlled to be between 1 and 5 mm. A suspension of the recycled fibers was blended inline with a mixture of 60 percent, by weight, hardwood kraft pulp (eucalyptus) and 40 percent, by weight, softwood kraft pulp (radiata pine) at a level of 5% by dry weight.

The furnish was formed into a wet sheet having a basis weight of 160 grams per square meter (gsm) using a conventional writing paper manufacturing process and then dried to a final product. The resulting product was compared to a control material prepared under the same conditions using the same virgin pulp materials but with no added recycled materials. These results are shown in Table 1 below:

TABLE 1

| PROPERTIES | Test Method | Product Without Recycled Material (CONTROL) | Product With 5% Recycled Material |
|---|---|---|---|
| Basis Wt | TAPPI - T410 | 163 gsm | 161.8 gsm |
| Thickness | TAPPI - T411 | 8.3 mils | 8.4 mils |
| Roughness FS | TAPPI - T538 | 198 Sheff. | 164 Sheff. |
| Roughness WS | TAPPI - T538 | 150 Sheff. | 145 Sheff. |
| Porosity | TAPPI - T489 | 94 Sheff. | 71 Sheff. |
| Opacity | TAPPI - T425 | 98.3% | 84.4% |
| Tensile MD | TAPPI - T494 | 12285 g/15 mm | 12155 g/15 mm |
| Tensile CD | TAPPI - T494 | 9127 g/15 mm | 8237 g/15 mm |
| Elongation MD | TAPPI - T404 | 1.0% | 1.0% |
| Elongation CD | TAPPI - T404 | 1.4% | 2.1% |
| Bursting strength | TAPPI - T403 | 51.2 psi | 54.2 psi |
| Dry Tear MD | TAPPI - T414 | 140 g | 144 g |
| Dry Tear CD | TAPPI - T414 | 156 g | 148 g |
| Folding endurance MD | TAPPI - T511 | 73 cycles | 115.5 cycles |
| Folding endurance CD | TAPPI - T511 | 59.5 cycles | 61.5 cycles |
| Stiffness MD | TAPPI - T489 | 20.9 T.U. | 21.0 T.U. |
| Stiffness CD | TAPPI - T489 | 12.6 T.U. | 12.6 T.U. |
| Dennison FS | TAPPI - T459 | 18 | 18 |
| Dennison WS | TAPPI - T459 | 18 | 18 |
| PH | TAPPI - T509 | 8.7 | 8.7 |
| Freeness | TAPPI - T227 | 670 mL | 650 mL |
| F.L.I. | TAPPI - T232 | 5.7 | 3.2 |
| Color L* | TAPPI - T527 | 92.54 | 92.71 |
| Color a* | TAPPI - T527 | −0.16 | 0.04 |
| Color b* | TAPPI - T527 | 0.06 | 0.47 |
| Brightness | TAPPI - T525 | 82.04% | 81.9% |

It is evident from these results that a paper sheet containing 5 percent, by weight, of the recycled material that includes synthetic fibers has physical properties essentially similar to the virgin pulp sheet. Importantly, the added recycled fibers did not detrimentally affect the paper making process stability and efficiency.

EXAMPLE 3

In this example, the starting material was a bonded web of meltblown polypropylene fibers available from Kimberly-Clark Corporation under the trade designation Kimtex® wiper. This material contained 100 percent meltblown polypropylene fibers and was shredded into pieces ranging from 10-30 mm in length and 5-20 mm in width. These pieces were transferred to a pulping process in a Hollander-type laboratory beater (Ross Paper Machinery Company, Newark, N.J.—Model RPM 15). Hydraulic pressure and mechanical shear stress were applied in two stages.

Hydraulic pressure and shear stress was produced by the pumping action created by the rotor forcing the wet material against the fixed blades. The rotor roll was approximately 7 ⅝ inch (~19.4 cm) in diameter. The working face of the roll was 6 inches (~15.4 cm) in width with thirty-two bars 3/16 inch (~4.8 mm) thick. The bedplate contained seven bars ⅛ inch (~3.2 mm) thick, spaced 3/32 inch (~2.4 mm) apart to form a 5 degree "V" at the center of the bedplate.

In stage one the weight or load applied to the rotor was set at 0 kg for 12 minutes, consistency was set to 1%, and a defoaming agent was added to control foam generation. During the first stage, the shredded material was wetted to achieve free flow of the material through the rotating roll and bedplate. During the second stage, the weight or load on the rotating roll was increased first to 5.2 kg for 23 minutes and then to 2.8 kg for 85 minutes. Conditions during the second stage produced small zones of very high pressure between the blades on the rotating roll and the bedplate to create a micro-bursting action on the shredded synthetic fiber bundles to blow apart and reduce the resulting synthetic fiber length. With these process conditions the resulting fibers have the following characteristics:

The fibers obtained consist of a mixture of some individual fibers, fiber bundles, small segments that still have bond points, curls, open layers of fibers, and flat areas.

Average length of the synthetic fibers and fiber bundles was 2.84 mm. The lengths ranged from 0.6 to 6.1 mm.

The recycled meltblown fibers were blended with a mixture of 60 percent, by weight, hardwood kraft pulp (eucalyptus) and 40 percent, by weight, softwood kraft pulp (radiata pine) at a level of 5% by dry weight. This furnish was formed into a wet sheet having a basis weight of 90 gsm in a conventional laboratory handsheet former, then pressed in a laboratory press and finally dried. The resulting product was compared to a control material prepared under the same conditions using the same virgin pulp materials but with no added recycled materials. These results are shown in Table 2 below:

TABLE 2

| PROPERTIES | Test Method | Handsheet Without Recycled Material (CONTROL) | Handsheet With 5% Recycled Material |
|---|---|---|---|
| Basis Wt | TAPPI-T410 | 90.4 gsm | 90.0 gsm |
| Size, Hercules Size Tester | TAPPI-T530 | 4 s | 11 s |
| Tensile | TAPPI-T494 | 6082 g/15 mm | 4957 g/15 mm |
| Elongation | TAPPI-T404 | 0.6% | 0.6% |
| Bursting strength | TAPPI-T403 | 44 psi | 31 psi |
| Dry Tear | TAPPI-T414 | 25 g | 25 g |
| Folding endurance | TAPPI-T511 | 97 cycles | 34 cycles |

Even though the paper sheet incorporating recycled meltblown fibers exhibits lower levels of some mechanical properties in comparison to the control material, the paper sheet containing recycled fibers is still considered to have generally good physical characteristics and is suitable for writing papers and other types of papers.

While the invention has been described in detail with respect to specific embodiments thereof, it will be appreciated that those skilled in the art, upon attaining an understanding of the foregoing may readily conceive of alterations to, variations of and equivalents to these embodiments. Accordingly, the scope of the present invention should be assessed as that of the appended claims and any equivalents thereto.

We claim:

1. A method of recycling bonded fibrous materials, the method comprising, providing pieces of bonded fibrous materials comprising synthetic fibrous material, the pieces having sizes that are adapted for suspension in a liquid;

suspending the discrete pieces of bonded fibrous materials in a liquid;

applying mechanical work to the liquid suspension of discrete pieces to generate hydraulic pressure and mechanical shear stress conditions sufficient to hydraulically fragment the bonded fibrous materials into fibers and fiber-like components; and separating substantially individual fibers and fiber-like components from the liquid.

2. The process of claim 1 wherein the step of providing discrete pieces of bonded fibrous materials comprises an operation to reduce the size of unitary bonded fibrous materials into discrete pieces that are adapted for suspension in a liquid, the operation being selected from mechanical shredding, mechanical cutting, mechanical tearing, mechanical grinding, water jet cutting, laser cutting, garnetting and combinations thereof.

3. The process of claim 1 wherein the mechanical work is applied to the liquid suspension utilizing a combination of blades mounted on a rotating roll and blades mounted on a fixed plate to generate areas of very high hydraulic pressure and mechanical shear stress.

4. The process of claim 3 wherein the blades mounted on the fixed plate are aligned at an angle in at least one dimension with respect to the direction of rotation of the rotating blades.

5. The process of claim 4 wherein the angle is between 20 degrees and 70 degrees.

6. The process of claim 1 wherein the mechanical work is applied to the suspension in multiple stages.

7. The process of claim 6 wherein mechanical work is applied to the suspension utilizing a first stage under conditions to generate hydraulic pressure and mechanical shear stress sufficient to wet the pieces of bonded fibrous materials and separate at least some portions of fibers and fiber-like components from the bonded materials and utilizing a second stage under conditions to generate hydraulic pressure and mechanical shear stress conditions sufficient to rupture the bonded fibrous materials, fibers and fiber-like components into substantially individual fibers and fiber-like components.

8. The process of claim 6 wherein the clearance between the rotating blades and the fixed blades at the closest point during the first stage is between about 20 millimeters and about 100 millimeters and between about 1 millimeter and about 20 millimeters during the second stage.

9. The process of claim 1 wherein the amount of mechanical work applied to the liquid suspension is greater than about 6 Horsepower —24 hours per dry ton of bonded fibrous material.

10. The process of claim 1 wherein the bonded fibrous materials are selected from woven fabrics, knitted fabrics, nonwoven webs and combinations thereof.

11. The process of claim 10, wherein the nonwoven webs are webs that are thermally bonded, adhesively bonded, mechanically entangled, solvent bonded, hydraulically entangled and combinations thereof.

12. The process of claim 1 wherein the bonded fibrous materials further comprise natural fibrous materials.

13. The process of claim 1 wherein the synthetic fibrous material includes thermoplastic fibers and filaments.

14. The process of claim 1 wherein the substantially individual fibers and fiber-like components have a relatively uniform length distribution.

15. The process of claim 14, wherein the fiber and fiber-like material has a length distribution that spans approximately 7 millimeters.

* * * * *